United States Patent [19]
Fridrich

[11] 3,750,240
[45] Aug. 7, 1973

[54] SNAP FOR FISHING TACKLE

[76] Inventor: Leslie R. Fridrich, 1531 S. 60th Ct., Cicero, Ill. 60650

[22] Filed: Jan. 5, 1972

[21] Appl. No.: 215,496

[52] U.S. Cl. .............................................. 24/237
[51] Int. Cl. ......................................... A44b 13/02
[58] Field of Search ................................. 24/237

[56] References Cited
UNITED STATES PATENTS

| | | | |
|---|---|---|---|
| 2,240,235 | 4/1941 | Whan | 24/237 |
| 472,962 | 4/1892 | Collins | 24/237 |
| 3,234,616 | 2/1966 | Wantland | 24/237 |
| 3,277,549 | 10/1966 | Bradshaw | 24/237 |

Primary Examiner—Paul R. Gilliam
Attorney—Charles W. Rummler, William A. Snow et al.

[57] ABSTRACT

A snap formed from a single piece of resilient wire wherein one end is bent to form an eye and then double looped over the main shank and terminating in a catch, the terminal end being bent in a direction forwardly, sidewardly and downwardly of the double loops. The other end of the wire is bent back upon the shank to form an elongated spring loop and terminating in an upstanding hook arranged to cooperatively removably engage the catch. The loop is positioned above and along the shank. The snap normally is secured to a fish hook or lure and is designed for fast opening and closing.

1 Claim, 7 Drawing Figures

PATENTED AUG 7 1973 3,750,240
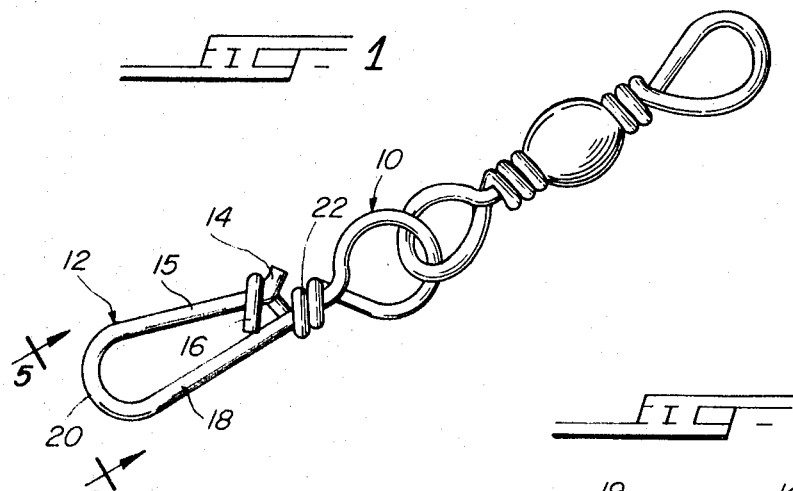
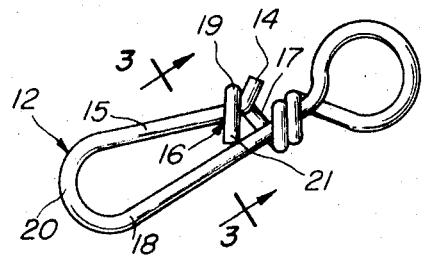
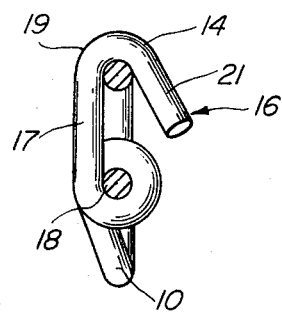
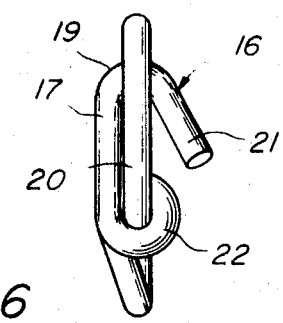
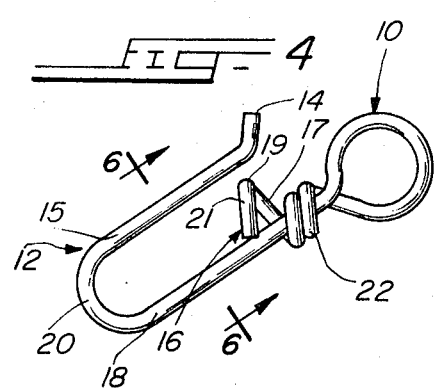
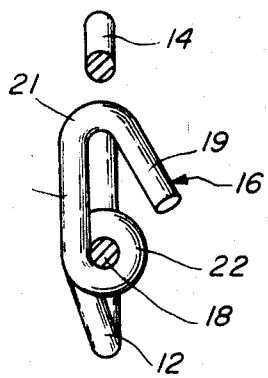
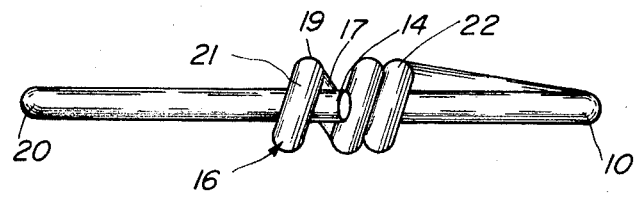

SNAP FOR FISHING TACKLE

BACKGROUND OF THE INVENTION

The snap hooks of the prior art are only of the general variety of a hook being engaged on the shank of the snap. These devices are not easily and readily separated when changing fish tackle, hooks or artificial lures. Also, the prior art devices are more difficult to open manually for speedy and efficient change of fishing tackle, as well as being capable of accidental opening.

SUMMARY OF THE INVENTION

The main objects of this invention are to provide a singularly stable snap for fishing tackle; to provide out of a single piece of flexible wire, one end of which is double looped over the main shank and terminates in a catch and eye combination, the other end of the wire forming an elongated loop extending upwardly and slightly offset from the main shank of the snap and terminating in a hook member; to provide a snap of this character which is quickly engaged and disengaged; and to provide a device of this character which is simple in construction and inexpensive to manufacture.

BRIEF DESCRIPTION OF THE DRAWINGS

FIG. 1 is an enlarged perspective view of my new snap for fishing tackle shown affixed to a swivel;

FIG. 2 is an enlarged perspective view of the snap per se shown in closed position;

FIG. 3 is a cross-sectional view taken on the lines 3—3 of FIG. 2;

FIG. 4 is a perspective view of my snap shown in open position;

FIG. 5 is an end elevation taken on the lines 5—5 of FIG. 1;

FIG. 6 is a cross-sectional view taken on the lines 6—6 of FIG. 4; and

FIG. 7 is a top view of the device shown in FIG. 2.

DETAILED DESCRIPTION OF THE INVENTION

The device is preferably constructed from a single piece of resilient spring steel wire preferably having a diameter of 0.020 inches. The device comprises an eye 10, a loop 12, a catch 14 and hook 16.

The eye 10 is circular in construction and formed by bending one end of the single strand of wire around a suitable jig to form an eye. This end is then double looped or wound twice around the shank 18, as indicated by the numeral 22, adjacent the eye 10 and terminating in a catch 16 on the end of a limb 17 connected to the shank 18 by a bight portion 20. It is to be noted from the drawing that the terminal end forming the catch 16, including limb 17, is bent forwardly at an angle away from the eye 10 and then bent to form a bight 19.

The main body of the shank 18 is then bent upwardly and rearwardly to form an elongated loop 12 which lies in open position above the main body of the shank 18 and slightly offset to the left as seen in FIG. 6. The portion 20 of the bend is smoothly shaped with no sharp corners.

The terminal or free end of the loop 12 is bent upwardly and rearwardly diagonally to form the hook 14.

A limb 21 is bent upwardly and diagonally toward and over the shank 18, as shown in FIG. 6. The limbs 17, 21 and bight 19 form a substantially V-shaped catch 16 that is obliquely disposed in a plane inclined relative to the loop 12.

Thus, when the hook 14 is engaged in the catch 16, it should be obvious that a slight downward pressure on the limb 15 as viewed in FIG. 2 will result in the hook 14 being disposed outside of the V-shaped catch 16. In the same motion, a slight downward pull on the latch 14 to a position over the limb 21 causes the snap to be opened, as shown in FIG. 4.

To re-engage the hook 14 with the latch 16, the limb 15 is depressed toward the shank 18. During the depression, the portion of the loop adjacent the hook may be resiliently carried upwardly out of the plane of the loop 20. However, when the limb 15 is depressed past the terminal end of the limb, the hook 14 is resiliently urged to its normal position coplanar with the shank 18. The hook 14 is then captured within the obliquely disposed V-shaped catch 16 so that the latching of the hook 14 therewith is greatly facilitated.

The double looping 22 of the wire on the shank 18 strengthens the snap and also prevents the catch 16 from inadvertently shifting and unlatching the hook.

What is claimed is:

1. A snap comprising a single wire bent to form an eye at one end of the snap and a loop, said loop comprising a first leg directed away from said one end and a second leg directed towards said one end and joined to the first leg by a bight, said second leg when in fastened condition sloping towards said first leg and terminating in a short section, said short section sloping away from said first leg and generally towards said one end both in released and fastened condition and joined by a bight to said second leg, to form a hook, said short section and said second leg lying in the same plane, the portion of the wire bent to form the eye being wrapped around the first leg of the loop and then being continued to form a portion sloping away from said first leg and towards the other end of the snap and joined by a bight to a terminal portion sloping towards said first leg and said other end and laterally away from the legs of the loop, said two portions and the connecting bight forming an inverted V-shape catch in elevation view and also an inverted V-shape catch in end view, the bight of the hook configuration of said loop interlocking with the bight of the catch in fastened condition, whereby the snap may readily be closed and opened by one hand.

* * * * *